US008316939B2

(12) United States Patent
Parlar et al.

(10) Patent No.: US 8,316,939 B2
(45) Date of Patent: *Nov. 27, 2012

(54) METHOD OF INSTALLING SAND CONTROL SCREENS IN WELLBORES CONTAINING SYNTHETIC OR OIL-BASED DRILLING FLUIDS

(75) Inventors: Mehmet Parlar, Sugar Land, TX (US); Balkrishna Gadiyar, Katy, TX (US); Sudhir Shenoy, Clairmont (CA); Shawn McCleskey Rimassa, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/502,289

(22) Filed: Jul. 14, 2009

(65) Prior Publication Data

US 2010/0044040 A1 Feb. 25, 2010

Related U.S. Application Data

(60) Provisional application No. 61/090,460, filed on Aug. 20, 2008.

(51) Int. Cl.
*E21B 43/04* (2006.01)
*E21B 21/00* (2006.01)

(52) U.S. Cl. ........................ 166/278; 166/305.1; 166/312

(58) Field of Classification Search .................. 166/276, 166/278, 57
See application file for complete search history.

(56) References Cited

U.S. PATENT DOCUMENTS

| 4,945,991 A | 8/1990 | Jones |
| 4,945,994 A | 8/1990 | Stagg |
| 5,320,178 A | 6/1994 | Cornette |
| 5,320,789 A | 6/1994 | Nishii et al. |
| 5,551,516 A | 9/1996 | Norman et al. |
| 5,964,295 A | 10/1999 | Brown et al. |
| 5,979,555 A | 11/1999 | Gadberry et al. |
| 5,979,557 A | 11/1999 | Card et al. |
| 6,140,277 A * | 10/2000 | Tibbles et al. ............... 507/201 |
| 6,220,345 B1 | 4/2001 | Jones et al. |
| 6,258,859 B1 | 7/2001 | Dahayanake et al. |
| 6,355,600 B1 | 3/2002 | Norfleet |
| 6,435,277 B1 | 8/2002 | Qu et al. |
| 6,450,260 B1 | 9/2002 | James et al. |
| 6,509,301 B1 | 1/2003 | Vollmer |
| 6,569,814 B1 * | 5/2003 | Brady et al. .................. 507/201 |
| 6,631,764 B2 * | 10/2003 | Parlar et al. ................... 166/278 |
| 6,638,896 B1 * | 10/2003 | Tibbles et al. ............... 507/201 |
| 6,660,693 B2 | 12/2003 | Miller |
| 6,695,054 B2 | 2/2004 | Johnson et al. |
| 6,703,352 B2 | 3/2004 | Dahayanake et al. |
| 6,883,608 B2 * | 4/2005 | Parlar et al. ................... 166/278 |
| 7,066,284 B2 | 6/2006 | Wylie et al. |
| 7,134,496 B2 | 11/2006 | Jones et al. |
| 7,225,879 B2 | 6/2007 | Wylie et al. |
| 7,250,390 B2 | 7/2007 | Patel et al. |
| 7,341,117 B2 | 3/2008 | Wylie et al. |
| 7,373,978 B2 | 5/2008 | Barry et al. |
| 7,419,004 B2 | 9/2008 | Salamat et al. |
| 2001/0036905 A1 | 11/2001 | Parlar et al. |
| 2003/0236174 A1 | 12/2003 | Fu et al. |
| 2004/0014606 A1 | 1/2004 | Parlar et al. |
| 2005/0028978 A1 | 2/2005 | Parlar et al. |
| 2005/0161219 A1 | 7/2005 | Hossaini et al. |
| 2008/0110618 A1 | 5/2008 | Quintero et al. |
| 2008/0128129 A1 | 6/2008 | Yeh et al. |
| 2009/0065207 A1 | 3/2009 | Shenoy et al. |
| 2009/0133875 A1 | 5/2009 | Tibbles et al. |

FOREIGN PATENT DOCUMENTS

| GB | 2420808 | 6/2006 |
| WO | 2004079145 | 9/2004 |
| WO | 2007092082 | 8/2007 |
| WO | 2007092082 A2 | 8/2007 |
| WO | 2010010539 | 1/2010 |

OTHER PUBLICATIONS

Ali, Syed and Griffith, George, "Synthetic Drill-in Fluid for GP Depleted Sands and Pressured Shale." Petroleum Engineer International, Mar. 1999. pp. 31-36.
SPE 64410—Tibbles, R., Blessen, E., Qian, X., Steven, B., Pardo, C., Hurst, G., Kubota, R., Mysko, P. Design and Execution of a 3000-ft Horizontal Gravel-Packed Completion (A Kazakhstan Case History) Oct. 16-18, 2000 Society of Petroleum Engineers Inc.
SPE 86532—Hurst, G., Cooper, S.D., Norman, W.D., Dickerson, R.C., Claiborne, E.B., Hess, A., Parlar, M. Tocalino, S. Alternate Path Completions: A Critical Review and Lessons Learned From Case Histories with Recommended Practices for Deepwater Applications. Feb. 18-20, 2004, Society of Petroleum Engineers Inc.
SPE 89815—Parlar, M. Twynam, A.J., Newberry, P. Bennett, C., Elliott, F., Powers, B., Hall, K., Svoboda, C., Rezende, J., Rodet, V. and Edment, B. Gravel Packing Wells Drilled with Oil-Based Fluids: A Critical Review of Current Practices and Recommendations for Future Applications. Sep. 26-29, 2004, Society of Petroleum Engineers Inc.
SPE 90758—Hecker, M.T., Barry, M.D., Martin, Jr., T.B. Reducing well Cost by Gravel Packing in Nonaqueous Fluid. Sep. 26-29, 2004. Society of Petroleum Engineers Inc.

(Continued)

*Primary Examiner* — Shane Bomar
*Assistant Examiner* — Silvana Runyan
(74) *Attorney, Agent, or Firm* — David G. Matthews; Rodney Warfford; Daniel N. Lundeen

(57) ABSTRACT

A method of installing a sand control screen assembly in a wellbore penetrating a subterranean formation is carried out in a wellbore having a cased section and an uncased section. The wellbore contains synthetic or oil-based drilling fluids containing drilled solids. A first water-based displacement fluid that contains a shale inhibitor is introduced into the wellbore to displace the synthetic or oil-based drilling fluids from the uncased section of the wellbore. A second water-based displacement fluid is introduced into the wellbore to displace fluids within the cased section of the wellbore. The sand control screen assembly is then run to a selected depth within the uncased section of the wellbore to facilitate a gravel packing operation.

25 Claims, 1 Drawing Sheet

OTHER PUBLICATIONS

SPE 98146—Powers, B.S., Edment, B.M., Elliott, F,J., Gilchrist, J.M., Twynam, A.J. Parlar, M. A Critical Review of Chirag Field Completions Performance-Offshore Azerbaijan B. Feb. 15-17, 2006. Society of Petroleum Engineers Inc.

SPE 107297—Whaley, K., Price-Smith, C., Twynam, A., Burt, D., Jackson, P. Greater Plutonio Openhole Gravel-Pack Completions: Fluid Design and Field Applications. May 30-Jun. 1, 2007. Societyof Petroleum Engineers Inc.

International Application No. PCT/IB2009/053253 International Search Report.

International Application No. PCT/IB2009/053664 International Search Report.

* cited by examiner

METHOD OF INSTALLING SAND CONTROL SCREENS IN WELLBORES CONTAINING SYNTHETIC OR OIL-BASED DRILLING FLUIDS

CROSS-REFERENCE TO RELATED APPLICATIONS

This application claims the benefit of U.S. Provisional Patent Application No. 61/090,460, filed Aug. 20, 2008, which is incorporated herein by reference in its entirety.

BACKGROUND

The statements in this section merely provide background information related to the present disclosure and may not constitute prior art.

Many wells, especially in oil fields in deep-water/subsea environments, are drilled with synthetic/oil-based muds or drilling fluids. Because of the extremely high cost of intervention and high production rates, these wells require a reliable completion technique that prevents sand production and maximizes productivity throughout the entire life of the well. One such technique is open-hole gravel packing.

Two common techniques used for gravel packing open holes include: (1) the alternate path technique and (2) the water packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

In unconsolidated formations, sand control measures are implemented to stabilize formation sand. Common practice for controlling sand displacement includes placement of a gravel pack to hold formation sand in place. The gravel pack is typically deposited around a screen. The gravel pack filters the sand while still allowing formation fluid to flow through the gravel, the screen and a production pipe.

Most of the recently discovered deep-water fields contain a high fraction of shales, which are water-sensitive, although many have been gravel packed with water-based fluids. A very large fraction of them have been completed with viscous fluids using the alternate path technique. Viscoelastic surfactant (VES) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

In wells drilled with synthetic or oil-based muds, three main approaches have been used for gravel packing. A first approach involves displacement of the entire wellbore to water-based fluids at the end of drilling the reservoir section, and subsequently running the sand control screens into the open hole, setting the packer and gravel packing with a water based fluid. As experienced by several operators, the problem with this approach is that exposure of reactive shales to water-based fluids for prolonged time periods can cause shale collapse or swelling which effectively reduces the wellbore diameter and makes it impossible to install sand control screens to the target depth or shale dispersion into the carrier fluid during gravel packing which can have a significant impact on well productivity. The success of this approach is therefore heavily dependent on the reactivity of the shales.

One approach subsequently practiced involved installation of a pre-drilled (perforated) liner in oil-based mud, then displacement of the entire wellbore to water based fluids, subsequent installation of the sand control screens to target depth and finally gravel packing with a water based fluid. This approach solved the problem of the inability to run the screens to target depth, since shale collapse would occur onto the pre-drilled liner, and the space inside the predrilled liner would be substantially free of shales, allowing the screens to be installed to target depth. The problems with this approach were two fold. First, it involved two trips (one for predrilled liner installation and another for screen installation), which is costly, particularly in deep water where rig costs are high. Secondly, a smaller size screen had to be installed into the wellbore, which in some cases can limit production rates, and thus increase the costs.

A more recent approach that has been practiced heavily in two deepwater Angola developments (see SPE 90758 and SPE 107297) and an oilfield in Azerbaijan (see SPE 98146) involved conditioning of the oil-based mud by passing the mud through shaker screens of a certain size (to prevent plugging of sand screens), then running the sand screens in conditioned oil-based mud, and subsequently displacing the wellbore to water based fluids and proceeding with gravel packing with a water based carrier fluid (U.S. Pat. Nos. 6,883,608 and 7,373,978). This approach has been successfully used in more than 75 wells to date by two major operators, in conjunction with the alternate path (shunt-tube) screens.

While the above-described methods may be adequate for installing sand screens and gravel packing in many wells formed in reactive shale-containing formations, improvements are desired.

SUMMARY

A method of installing a sand control screen assembly in a wellbore penetrating a subterranean formation is carried out in a wellbore having a cased section and an uncased section. The wellbore contains synthetic or oil-based drilling fluids containing drilled solids. A first water-based displacement fluid that contains a shale inhibitor is introduced into the wellbore to displace the synthetic or oil-based drilling fluids from the uncased section of the wellbore. A second water-based displacement fluid is introduced into the wellbore to displace fluids within the cased section of the wellbore. The sand control screen assembly is then run to a selected depth within the uncased section of the wellbore to facilitate a gravel packing operation. In many embodiments, the area of the subterranean formation surrounding the wellbore may contain reactive shale.

In certain embodiments the second water-based displacement fluid may also contain a shale inhibitor. The shale inhibitor may be comprised of at least one of an acrylamide-based polymer, a lignosulfonate, a glycol and an amine.

In at least one of the first and second water-based displacement fluids the fluid may be a brine, which may contain potassium chloride. The first and second water-based displacement fluids may also be viscosified and may contain a bridging agent.

The sand control screen assembly used may include shunt tubes. In certain embodiments, the sand control screen assembly includes diverter valves to divert fluid returns to facilitate prevention of pressure build up. The sand control screen may also be an expandable screen.

A gravel pack slurry containing gravel and a water-based carrier fluid may be introduced into the wellbore after the sand screen assembly is in place. The water-based carrier fluid may be an aqueous brine. The carrier fluid may be viscosified and may include a shale inhibitor.

In certain embodiments, at least one of 1) a mutual solvent, 2) a surfactant, and 3) a fresh synthetic or oil-based fluid that is free of drilled solids is introduced into the wellbore ahead of the first water-based displacement fluid.

In another method, a sand control screen assembly is installed in a wellbore penetrating a subterranean formation is carried out in a wellbore having a cased section and an uncased section. The area of the subterranean formation surrounding the wellbore contains reactive shale. The wellbore initially contains synthetic or oil-based drilling fluids containing drilled solids. In the method, a first water-based displacement fluid that contains a shale inhibitor is introduced into the wellbore to displace the synthetic or oil-based drilling fluids from the uncased section of the wellbore. A second water-based displacement fluid is introduced into the wellbore to displace fluids within the cased section of the wellbore. The second water-based displacement fluid contains a shale inhibitor that is the same or different from that contained in the first water-based displacement fluid. The sand control screen assembly is run to a selected depth within the uncased section of the wellbore to facilitate a gravel packing operation. A gravel pack slurry containing gravel and a water-based carrier fluid may then be introduced into the wellbore for gravel packing.

In certain embodiments the shale inhibitor is comprised of at least one of an acrylamide-based polymer, a lignosulfonate, a glycol and an amine. In some embodiments, at least one of 1) a mutual solvent, 2) a surfactant, and 3) a fresh synthetic or oil-based fluid that is free of drilled solids is introduced into the wellbore ahead of the first water-based displacement fluid.

BRIEF DESCRIPTION OF THE FIGURES

For a more complete understanding of some embodiments of the invention, and the advantages thereof, reference is now made to the following descriptions taken in conjunction with the accompanying figures, in which.

DETAILED DESCRIPTION

Figure 1:
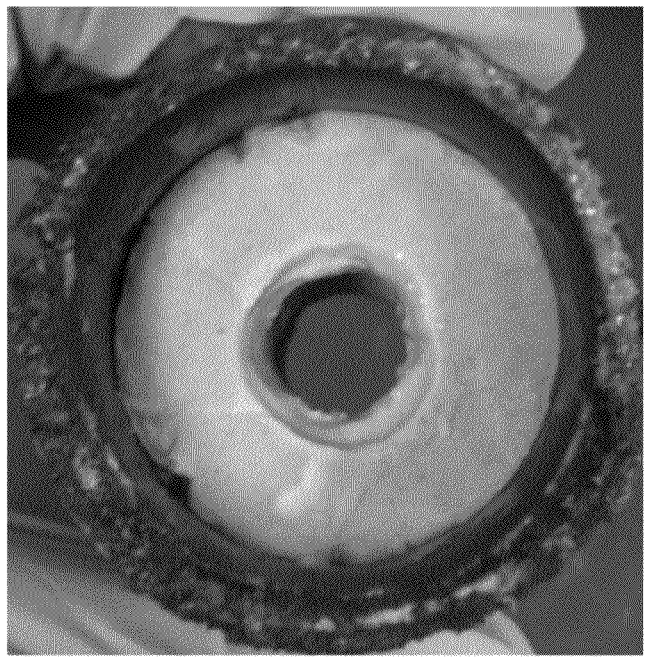
FIG. 1 is a photo of a synthetic shale core sample having a borehole that was soaked in an oil-based mud that was then displaced with deionized water and subsequently flushed using deionized water to simulate a gravel packing operation.

The description and examples are presented solely for the purpose of illustrating the different embodiments of the invention and should not be construed as a limitation to the scope and applicability of the invention. While any compositions may be described herein as comprising certain materials, it should be understood that the composition could optionally comprise two or more chemically different materials. In addition, the composition can also comprise some components other than the ones already cited. While the invention may be described in terms of treatment of vertical wells, it is equally applicable to wells of any orientation. The invention will be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Some embodiments are directed toward novel techniques used for gravel packing and installing sand control screens in a wellbore that may contain synthetic or oil-based drilling muds or fluids, such as those used in drilling wells in formations having reactive shale or clay. As used herein, the expressions "reactive shale" or "reactive clay" or similar expressions may be used interchangeably and refer to those shale or clay materials that may swell, crumble, particalize, flake, slough off or otherwise deteriorate when exposed to aqueous fluids, particularly fresh water.

Synthetic or oil-based drilling muds or fluids may be used during drilling to prevent damage or deterioration of the formations containing reactive shale or clay. As used herein, the expressions "drilling muds," "drilling fluids" or similar expressions may be used interchangeably and are meant to encompass those fluids used during the drilling of a wellbore. Synthetic-based drilling fluids are typically those that include non-naturally occurring components that are derived through chemical processes from petroleum products. Non-limiting examples of such synthetic-based components include chemically-produced mineral oils, paraffins, linear olefins, esters, etc. Oil-based drilling fluids are those that include components derived or extracted from naturally existing petroleum products through refining or other separating techniques. Non-limiting examples of such oil-based components include refinery-produced diesel, mineral oil and paraffins.

The synthetic or oil-based drilling fluids may be formed entirely from non-aqueous synthetic or oil-based fluids or may include an aqueous or water component. Such synthetic or oil-based drilling fluids that include an aqueous or water component may be in the form of emulsions, where the aqueous component is present as an internal phase within a continuous or external synthetic or oil phase. The aqueous phase may be a brine, saline or salt solution, and may contain emulsifiers for forming the emulsion. The aqueous phase may be present in an amount of from about 2% to about 60% by volume of the fluid, although lesser or greater amounts may be used.

In the drilling of a well, the synthetic/oil-based muds or drilling fluids may be used in formations containing reactive shall or clay materials. The drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where a sand control screen assembly is placed to facilitate gravel packing for controlling the migration and production of formation sand and to stabilize the formation of the open hole section.

Once the wellbore is drilled, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections. Prior to installing sand control screens, the synthetic/oil-based drilling fluid is first displaced from the open hole section to a water-based displacement fluid that contains a shale inhibitor. A second water-based fluid that may optionally contain the same or a different shale inhibitor is then used to displace the fluid in a cased hole section. Sand control screens are then run to target depth. The sand control screen may be a standalone sand screen or an expandable sand screen installed. After the sand control screen is installed, the well may be gravel packed with a water-based fluid.

The water-based fluids used for the displacement fluids, and for the carrier fluids used in subsequent gravel packing, may be formed from aqueous brines. The aqueous brine is comprised of water and inorganic salts and/or organic salts. The inorganic salts may include monovalent salts of alkali metal halides and divalent salts of alkali earth metal halides. Examples of suitable monovalent salts include sodium, potassium or cesium chloride or bromide. Examples of suitable inorganic divalent salts include calcium halides, for example, calcium chloride or calcium bromide. In particular applications, the aqueous displacement fluid is a brine containing potassium chloride. The potassium chloride is particularly well suited and may be used in an amount of about 3% to about 6% or 7% or more by weight. Zinc halides, especially zinc bromide, may also be used. The inorganic salts can be added to the aqueous displacement fluid in any hydration state (i.e. anhydrous, monohydrated, dihydrated, etc.). The aqueous displacement fluid may also comprise an organic salt, such as sodium, potassium or cesium formate, acetate or the like. The amount of salts used may provide a desired density to the displacement fluid, as well as in some cases shale stability. Typically, the water-based displacement fluid will have a density of up to about 19 ppg (2.3 kg/liter).

The salts used in the displacement fluids and in other treatment fluids used may be compatible with the drilling fluid that was used to drill the wellbore or other fluids used in treatment of the well. Thus the salts in the displacement fluid can also be the same as the salts used in the drilling fluid. In embodiments where a zwitterionic surfactant is employed, as is described later on, the electrolyte may also be compatible with the brine.

The water-based displacement fluids and other fluids used, may further contain a shale inhibitor. The shale inhibitor may react with the formation mineralogy to stabilize shales or clays from swelling and prevent further movement or deterioration. The shale inhibitor can also inhibit or prevent damage in the reservoir rock that might otherwise occur due to mobilization of fines, i.e. formation permeability damage due to fines migration to block pores. The amount and type of shale inhibitor used is selected to achieve the desired effect in controlling reactivity of the fluids with the shales and clays. Some examples of shale inhibitors are acrylamide based polymers, lignosulfonates, amines, glycols, and the like, or a combination of such compounds. The shale inhibitors may be used in amounts of from about 0.4% to about 4% by weight of the fluid, although lesser or greater amounts may be used.

Amine shale inhibitors are particularly well suited in some embodiments. The amine shale inhibitors may be organoamine compounds. Examples of suitable organoamine compounds include, but are not necessarily limited to, tetraethylenepentamine, triethylenetetramine, pentaethylenehexamine, triethanolamine, and the like, or any mixtures thereof. When organoamine compounds are used in fluids, they may be incorporated in an amount from about 0.01 wt % to about 2.0 wt % based on total liquid phase weight, more particularly, the organoamine compound may be incorporated at an amount from about 0.05 wt % to about 1.0 wt % based on total liquid phase weight. A particularly useful organoamine compound is tetraethylenepentamine, particularly when used with diutan viscosifying agent at temperatures of approximately 150° C. (300° F.).

Other nonlimiting examples of suitable amine shale inhibitors include those disclosed in U.S. Provisional Patent Application Ser. No. 60/971,455, filed Sep. 11, 2007, and in corresponding U.S. Pat. App. Pub. No. 2009/0065207, both of which are incorporated herein by reference in their entireties. In some embodiments, the shale inhibitor may be a polyamine of the formula $H_2$—N—R-(O-R')x-$NH_2$ wherein R and R' are divalent hydrocarbyl such as alkylene of from 1 to 6 carbon atoms, e.g. methylene, ethylene, propylene, butylene, pentylene, hexylene, or the like, and x has a value from 1 to 10, or an acid addition product thereof. The shale inhibitor in one embodiment is a poly(oxyalkylene) polyamine. In certain embodiments, R and R' in the above formula are the same or different branched alkylene of 3 to 5 carbon atoms, e.g. 1,2-propylene, 1,2-butylene, 1,3-butylene, 1,2-pentylene, 1,3-pentylene, 1,4-pentylene, etc. In other embodiments, the shale inhibitor is a diamine ether according to the following Formula (1):

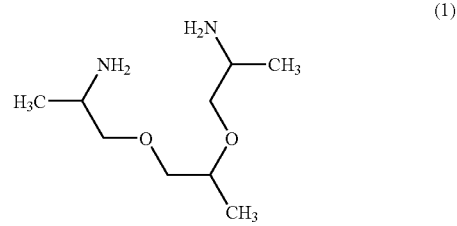

(1)

or an acid addition salt thereof.

Glycol based shale inhibitors may include alkylene glycols, such as propylene or ethylene glycol.

The water-based displacement fluids and other fluids, such as the gravel packing carrier fluids, may also be viscosified with a viscosifying agent. The amount and type of viscosifying agent is selected to provide the desired viscosity or to provide the desired carrying effect for the gravel particles and to ensure efficient return of the carrier fluid. The viscosifying agents may include those described in U.S. Pat. App. Pub. No. 2009/0065207, which is herein incorporated by reference.

In some embodiments, the viscosifying agent may be a solvatable or hydratable polymer that is either crosslinked or non-crosslinked (i.e. linear). Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers may also be used and are particularly well suited for high-temperature applications.

In various embodiments, the polymer viscosifying agent may be present in an amount of from about 0.1 wt. % to about 1.5 wt. % of total weight of the fluid, from about 0.1 wt. % to about 0.7 wt. % of total weight of fluid, from about 0.1 wt. % to about 0.6 wt. % of total weight of fluid, from about 0.1 wt. % to about 0.5 wt. % of total weight of fluid, from about 0.1 wt. % to about 0.4 wt. % total weight of fluid, from about 0.1 wt. % to about 0.3 wt. % of total weight of fluid, or even from about 0.1 wt. % to about 0.2 wt. % of total weight of fluid.

In other embodiments, a viscoelastic surfactant (VES) may be used as a viscosifying agent for the fluids. The VES may be selected from the group consisting of cationic, anionic, zwitterionic, amphoteric, nonionic, and combinations of these. Non-limiting examples include those described in U.S. Pat. Nos. 5,551,516; 5,964,295; 5,979,555; 5,979,557; 6,140,277; 6,258,859; 6,435,277; 6,509,301 and 6,703,352, each of which are incorporated herein by reference. The viscoelastic surfactants, when used alone or in combination with other viscosifying agents, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into the fluids, the amount of the VES can range from about 0.2% to about 15% by weight of total weight of the fluid, more particularly from about 0.5% to about 15% by weight of total weight of fluid, more particularly from about 2% to about 10% by weight of total weight of fluid.

Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S., Harris et. al.

The viscosified water-based fluids may also be formed from a combination of those hydratable polymers, VES and associative polymers previously described and provided in various amounts and proportions to provide the desired carrier fluid properties.

Other additives used in the water-based displacement fluids may include bridging agents and/or weighting agents, which are also commonly used in drilling fluids. Bridging agents may be added to the fluid to bridge across pore throats of exposed rock to facilitate building of a filter cake along the surfaces of the formation to prevent loss of treatment fluids to the formation. The bridging agents may be selected to be removable, such as due to their solubility in certain fluids. Examples of bridging agents may include calcium carbonate, calcium hydroxide, various water soluble salts, soluble polymers (e.g. polylactic acid), waxes, oil-soluble resin, etc. These may be used in an amount of from about 10 lbs/bbl (28.3 kg/m$^3$) to about 30 lbs/bbl (85.2 kg/m$^3$) of the displacement fluid. In some applications, the bridging agent may be used in the first water-based displacement fluid that is used for displacing the open hole section of the well but not for the displacement fluid used in displacing the cased hole section.

Weighting agents may be used to increase the density of the displacement fluids. These materials may be finely divided solid materials that have high specific gravities. Examples of weighting agents may include barite, hematite, siderite, ilmenite, etc. Calcium carbonate may also be used as a weighting agent, in addition to a bridging agent. Barite is a particularly well suited weighting agent, having a minimum specific gravity of 4.2 g/cm$^3$. Weighting agents may be used in varying amounts that provide the desired weighting characteristics to the synthetic/oil-based displacement fluids.

If solids are used in the water-based displacement fluids, such as bridging agents, etc., these may be selected to be sufficiently small so that they readily pass through and do not plug or interfere with the openings of the sand control screen. Typically, such solids will be selected to have a particle size to provide a screen-opening-to-particle-size ratio of about 4:1 to about 6:1 or higher. In some embodiments, the synthetic or oil-based displacement fluid may be substantially free of any solids, including non-drilled solids.

The aqueous displacement fluid may contain various other additives. These may include mutual solvents, surfactants and non-emulsifiers to facilitate non-detrimental interaction with the synthetic/oil-based fluids that are being displaced. The mutual solvent or surfactant may be present within the water-based displacement fluid in an amount of from about 10% or less by weight. Examples of suitable mutual solvents include ethyleneglycolmonobutylether (EGMBE), methanol, etc.

Displacement of the synthetic/oil-based drilling fluids from the open hole section may be carried out by introducing the first water-based displacement fluid containing the shale inhibitor into the wellbore by passing the displacement fluid through the tubular drill string to the open hole section. As the water-based displacement fluid is pumped through the drill string, the synthetic/oil-based drilling fluids in the open hole section are carried upward through the annulus formed by the casing and the drill string. The shale inhibitor of the water-based displacement fluid facilitates maintaining of the integrity of the open hole section, which may contain reactive shales or clays that would otherwise be damaged if no shale inhibitor were used with the displacement fluid to displace the drilling muds or fluids. In certain embodiments, the volume of water-based displacement fluid used is sufficient to displace the open hole section plus the cased hole section up to the packer setting depth. The volume of water-based displacement fluid used may vary, however.

When a sufficient volume of the water-based displacement fluid is introduced into the wellbore to displace the drilling fluid from the open hole section of the wellbore, a second water-based displacement fluid is used to displace at least a portion or all of the cased hole section of the wellbore. In certain embodiments, the volume of the second water-based displacement fluid is sufficient to displace the entire cased section above the packer setting depth. This may be carried out by raising the end of the tubular drill string so that it is positioned within the cased hole section above the open hole section so that the second water-based displacement fluid is discharged from the end of the drill string into the cased hole section.

The second water-based displacement fluid may be the same or similar to the first water-based displacement that is used for displacing the open hole section. The second water-based displacement fluid may be a brine, as described previously. The second water-based displacement fluid may contain no shale inhibitor in certain embodiments. In other embodiments, the second water-based displacement fluid may contain a shale inhibitor that is the same or different than that used in the first water-based displacement fluid with the shale inhibitor being used in the same or different amounts to that of the first water-based displacement fluid. In certain embodiments, the amount of shale inhibitor in the second water-based displacement fluid may be less than that used in the first displacement for the open hole section.

The second water-based displacement fluid may contain the same or similar additives to the first water-based displacement fluid, such as mutual solvents, surfactants, shale stabilizers, non-emulsifiers, viscosifiers, bridging agents, weighting agents, etc., as those previously described.

The use of the water-based displacement fluids in the open and cased hole sections, respectively, facilitates the removal of solids present in the drilling fluids that could otherwise clog the sand screens. Additionally, the use of the shale inhibitors in the displacement fluid in the open hole section prevents the reactive shales and clay materials in the open hole section from swelling, collapsing or otherwise deteriorating and thus preventing sand screens from being lowered to the desired position within the well bore. This may eliminate the need for the use of a liner, as used in prior art methods. Because the second water-based displacement fluid is located substantially within the casing, the fluid is isolated from the open hole section, so there may be no or little potential for damage to the reactive materials of the formation from these fluids if no shale inhibitor or lesser amounts are used in this fluid.

The displacement method of some embodiments may be used with almost any type of sand control screen assembly. These may include wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. The sand control screen assembly may also include those with alternate flow paths or shunt tubes. Moreover, screen assemblies may include those that include diverter valves for diverting fluid returns through a shorter pathway, preventing pressure build up during the gravel packing process. An example of such a sand control screen that is suitable for some methods is that described in U.S. Pat. App. Pub. No. 2009/0133875, which is herein incorporated by reference in its entirety. The sand control screen assembly may also be an expandable sand screen. An example of expandable sand screen that may be used is that described in U.S. Pat. No. 6,695,054, which is hereby incorporated herein by reference.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a water-based carrier fluid is introduced into the wellbore to facilitate gravel packing of the open hole section of wellbore in the annulus surrounding the sand control screen. Gravel packing is sometimes used on unconsolidated formations, which tend to produce an undesirably high level of particulates together with the formation fluids. The method involves the placement of a slurry comprising a quantity of gravel and/or sand having a suitable mesh size into the formation adjacent to the wellbore. It is sometimes desirable to bind the gravel particles together to form a porous matrix for passage of formation fluids while facilitating the filtering out and retention in the well of the bulk of the unconsolidated sand and/or fines transported to the near wellbore area by the formation fluids. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member. The carrier fluid is conducted to the crossover tool and into the annulus between the casing and the tubular member above the packer. Optionally, fluids used are then removed from the emplaced gravel or sand.

The gravel particles used for gravel packing can be ceramics, natural sand or other particulate materials suitable for such purposes. The gravel particles are sized so that they will not pass through the screen openings. Typical particle sizes in U.S. mesh size may range from about 8 (2.38 mm) or 12 mesh (1.68 mm) to about 70 mesh (0.210 mm). A combination of different particle sizes may be used. Examples of typical particle size combinations for the gravel particles include 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). The gravel particles may be coated with a resin to facilitate binding of the particles together. The resin-coated particles may be pre-cured or may cure in situ, such as by an overflush of a chemical binding agent or by elevated formation temperatures.

The gravel pack carrier fluid may also be a water-based fluid. The aqueous fluid may be composed of an aqueous completion brine or salt solution and may be the same or similar to those used for the water-based displacement fluids. The gravel packing carrier fluid may contain the same or similar additives used for the water-based displacement fluids. These may include shale inhibitors, viscosifiers, bridging agents, weighting agents, etc. Other optional additives may include filter cake clean up reagents, such as chelating agents or acids (e.g. hydrochloric, hydrofluoric, formic, acetic, citric acid), corrosion inhibitors, scale inhibitors, biocides, leak-off control agents, among others. In other embodiments, the carrier fluid may not contain the additives of the displacement fluids, (e.g. no shale inhibitor, etc.) or may contain different additives. Available water, other than brine, may also be used in some embodiments as the carrier for the treatment fluid.

In one embodiment, a shale inhibitor can be used in a post gravel pack clean up flush, where the gravel pack is otherwise conventional or in accordance with the gravel packing embodiments just described. In this embodiment, a cleanup flush stage is pumped into the well, the flush stage comprising the inhibitor and additives to dissolve the filter cake, and optionally also comprising a brine such as KCl or tetramethyl ammonium chloride (TMAC) or another clay stabilizer. As the flush stage takes effect, the apparent permeability of the formation increases and a portion of the flush stage fluid leaks off into the formation. The presence of the shale inhibitor in the leakoff fluid allows the formation which is contacted thereby to absorb the inhibitor and reduce the risk of formation damage due to fines migration into the gravel pack, for example, relative to a fluid without any inhibitor, or with only a temporary inhibitor, which might cause a water sensitive formation to have impaired productivity. Another benefit in this embodiment is that the shale inhibitor in the treatment fluid can facilitate stabilization of the borehole, especially in shale and other water-sensitive formations.

In some embodiments, prior to the introduction of the first water-based displacement fluid, a synthetic/oil-based spacer fluid may optionally be introduced into the open hole section ahead of the displacement fluid. The spacer fluid may be the same or similar to the synthetic/oil-based fluids used as drilling fluids, such as those described previously. The synthetic/oil-based spacer fluid is a fresh synthetic/oil-based fluid, however, that does not contain any drilled solids or cuttings. As used herein, the expression "fresh" with respect to the synthetic and oil-based fluids described herein is meant to encompass those synthetic and oil-based fluids that have not been previously used as drilling muds or fluids that may contain some portion of cuttings or drilled solids, and is meant to exclude those synthetic and oil-based fluids that have been previously used as drilling fluids or muds but that may have been filtered or otherwise conditioned to remove any cuttings or drilled solids. The fresh synthetic/oil-based spacer fluid may be used to facilitate compression or leveling of the filter cake formed on the formation surfaces. If the spacer fluid is formed entirely from non-aqueous synthetic or oil-based fluids, it may also facilitate breaking down of the emulsions where an aqueous component is used in the synthetic/oil-based drilling fluids.

The spacer fluid may also be an aqueous fluid that contains a mutual solvent or surfactant, having solubility for both the synthetic/oil-based drilling fluid and the aqueous displacement fluid. Such spacer fluid may be used in situations where the water-based displacement fluid is sensitive to the synthetic/oil-based drilling fluids present in the wellbore section. This may be true when VES viscosified fluids are used as the water-based displacement fluid, which may break when contacted with synthetic or oil-based fluids. The aqueous spacer fluid may be an aqueous fluid that is similar in composition to the water-based displacement fluids and carrier fluid used for gravel packing, as previously described. This includes the use of aqueous brines and salt solutions, with similar additives, including the shale inhibitors as previously described. A viscosifying agent, such as those previously described, may also be used in the spacer fluid. The viscosifying agent may be present within the spacer fluid in similar or lesser amounts than those used for the water-based displacement fluids or carrier fluids. The mutual solvent or surfactant may be present within the spacer fluid in an amount of from about 10% or less by weight. Examples of suitable mutual solvents include ethyleneglycolmonobutylether (EGMBE), methanol, etc.

The spacer fluid is introduced into the open hole section of the wellbore prior to the introduction of the first water-based displacement fluid. The spacer fluid is typically used in a volume of about 10 bbl (1.59 m$^3$) to about 150 bbl (23.9 m$^3$). In other embodiments no spacer fluid is used.

Some embodiments provide for methods for installing a sand screen assembly in an open hole section of wellbore in a subterranean formation containing reactive shales or clays. By using a water-based displacement fluid containing shale inhibitor in the open hole section of the well, the drilling fluid can be effectively displaced to remove drilling solids without damaging the formation. A second water-based displacement fluid that may optionally contain a shale inhibitor is used to displace fluids from the cased section of the wellbore. This allows the screen assembly to be run fully to target depth in fluids that do not contain drilled solids and ensures that reactive formation materials do not collapse, swell or otherwise deteriorate that might otherwise prevent the screen assembly from being properly positioned. Once the screen assembly is in place, gravel packing can be carried out to consolidate the formation materials. The well can then be placed in production with formation fluids flowing through the gravel pack and screen and through the wellbore to the surface.

The following examples serve to further illustrate the invention.

EXAMPLES

Experimental

Shale Preparation

In the examples that follow synthetic shale cores were used. The synthetic shale cores were prepared by first dry-mixing 30 wt % sodium montmorillonite powder, 10 wt % kaolin powder and 60 wt % silica flour, which represent three of the common components of reactive shales, with kaolin and montmorillonite representing the clay fraction and silica representing quartz. The formation fluid was simulated with 1 wt % NaCl solution and was added to the dry mixture at a concentration of 15.1 wt %. The combination was mixed several times until a uniform paste resulted. The mixed paste was then packed into a 6.5" (16.5 cm) long Hassler sleeve (Internal diameter=1.5" (3.8 cm)) and loaded into a Hassler cell. A constant pressure of 1200-psi (8,270 kPa) was then applied for 3 days to compress it further. During the compression process, the ends of the core were left open to atmosphere and supported with a combination of 325 mesh (0.044 mm) screen, filter paper and 3M's Scotch Brite scouring pad. This allowed fluid to drain from the end as compression proceeded. The hardened core was then removed, wrapped twice in plastic wrap to prevent drying and stored for subsequent use. Given that there is no natural cementation, this shale is highly dispersive wherein brief contact with water will cause the shale to disintegrate. The shale is therefore a highly reactive medium for testing and serves as a worst-case scenario.

Dynamic Flow Through Testing (DFTT)

To simulate the effect of turbulent flow on shale during a gravel pack, fluid was flowed fluid through a hole drilled in each shale core at flow rates that scale to actual gravel pack flow conditions. This was done in an attempt to evaluate the potential erosion effects and simulate shale failure under gravel pack flow conditions. The shale cores used were 1.5" (3.8 cm) in diameter and 2" (5.1 cm) in length. The cores were placed in a 1.5" (3.8 cm) ID hose and held in place with hose clamps. The 2 open faces of the core were then sealed with beeswax. A 1.5" (3.8 cm) OD metal end piece was also inserted into the hose and held in place with hose clamps. A 0.195" (0.5 cm) diameter hole was then drilled in air (dry) through the center of the core parallel to the z-axis of the core.

After drilling the hole, the end piece was briefly removed to clear obstructions between the core and the end piece. After inspection, the core was placed back into the hose and resealed with beeswax, if necessary. The beeswax was used to limit contact of any fluid pumped through the core to the inner surface of the drilled borehole only. The actual test was run immediately after drilling and inspection to minimize drying of the core.

Each test was started with one or several soak stages to simulate the exposure history of the shale during the completion process (for example: 16 hours with drilling fluid and then 24 hours with displacement fluid). The actual gravel pack was then simulated with a flush stage, where a pump that is capable of running continuously at 2-Liters/min was used to pump fluids through the core.

The flush stage was run with a fixed volume of flush fluid (2 liters in these tests) where the fluid was recirculated through the core in a closed loop for the duration of the test. The duration of the flush was dependent on the duration of the gravel pack stage. During the flush, the turbidity and flow rate of the fluid was measured at regular intervals (every 10 minutes for the first hour, 20 minutes for the 2nd hour and every 30 minutes for the remaining 2 hours. Turbidity was measured using a Hach DR2000 spectrophotometer.

Comparative Example 1

A small volume of an oil-based mud, available as VersaPRO® mud from M-I Swaco, at 9.4 ppg (17.5 kg/L) with 11.6 ppg (19.9 kg/L) aqueous $CaCl_2$ as the internal aqueous phase, was injected to soak the entire length of the drilled wellbore. The wellbore was allowed to soak in this fluid for 16 hours. At the end of the 16 hours, the mud was drained and flushed with 500 mL deionized water which was discarded. The flush stage was run with deionized water with a fixed volume of 2 liters that was recirculated.

The wellbore was inspected for changes after the 16 hour oil-based mud soak. The visual observations and the clarity of the fluid drained from the wellbore as well as the 500 mL deionized water flush indicated that the wellbore was intact after this stage. After the water flush was started at 2 L/min, failure was noted immediately. The first turbidity reading made 10 minutes into the test was already greater than 461 FTU (Formazin Turbidity Unit), which is the upper limit of the instrument. The test was stopped after 75 minutes as the water had turned extremely turbid. FIG. 1 shows the borehole at the end of the test was severely enlarged or eroded.

Example 2

A small volume of an oil-based mud, available as VersaPRO® mud from M-I Swaco, at 9.4 ppg (17.5 kg/L) with 11.6 ppg (19.9 kg/L) aqueous $CaCl_2$ as the internal phase, was injected to soak the entire length of the drilled wellbore. The wellbore was allowed to soak in this fluid for 16 hours. At the end of 16 hours, the mud was drained and flushed with a displacement fluid of a 500 mL $CaCl_2$ brine containing approximately 3 vol % of an amine-type shale stabilizer at 9.4 ppg (17.5 kg/L) density, which was then discarded. A second soak stage was initiated where a small volume of the $CaCl_2$ displacement brine with approximately 3 vol % amine-type shale stabilizer was injected in the borehole and allowed to soak for 24 hours. At the end of 24 hours, the fluid was drained and the borehole was flushed with a small volume (<20 ml) deionized water, which as then discarded. Finally, a flush stage was run where deionized water with a fixed volume of 2 liters was circulated through the borehole.

Figure 2:
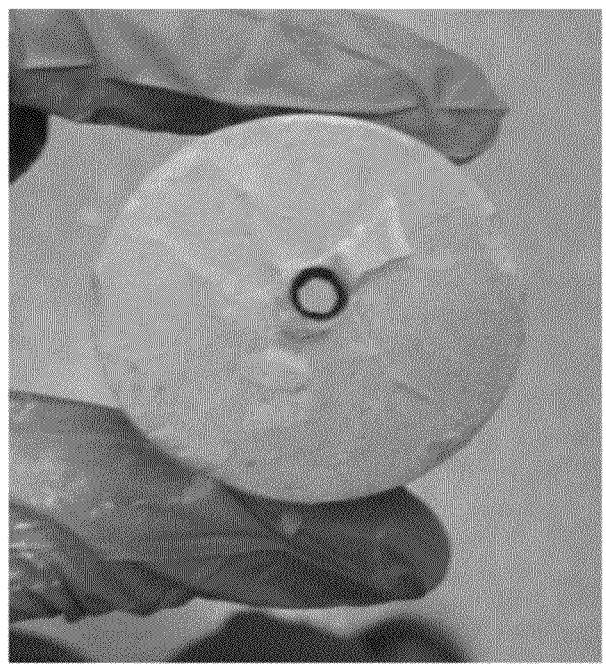
FIG. 2 is a photo of a synthetic shale core having a borehole that was soaked in an oil-based mud that was then displaced with a brine containing a shale inhibitor and subsequently flushed with deionized water to simulate a gravel packing operation.

The borehole was inspected for changes after both the 16 hour oil-based mud soak and the 24 hour displacement brine soak. Visual observations and the clarity of fluid drained confirmed that the borehole was intact after both these stages. The deionized water flush was immediately started after the brine/shale stabilizer soak stage. The test was run for 4 hours with turbidity and mass flow rate measured at the prescribed intervals. Throughout the entire four hour flush stage, the turbidity of the water was zero and did not change. The stability of the drilled hole (i.e. the simulated borehole) was confirmed by the visual observation as seen in FIG. 2, which shows that the hole diameter remained unchanged.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of installing a sand control screen assembly in a wellbore penetrating a subterranean formation, the wellbore comprising a cased section and an uncased section and containing a synthetic or an oil-based drilling fluid containing drilled solids, wherein the uncased section is liner-less, the method comprising:
   introducing a first water-based displacement fluid that contains a shale inhibitor into the wellbore to displace the synthetic or oil-based drilling fluids from the uncased, liner-less section of the wellbore;
   then introducing a second water-based displacement fluid into the wellbore to displace fluids within the cased section of the wellbore; and
   then running the sand control screen assembly to a selected depth within the uncased, liner-less section of the wellbore to facilitate a gravel packing operation.

2. The method of claim 1, wherein:
the second water-based displacement fluid contains a shale inhibitor.

3. The method of claim 1, wherein:
the shale inhibitor is comprised of at least one of an acrylamide-based polymer, a lignosulfonate, a glycol and an amine.

4. The method of claim 1, wherein:
at least one of the first and second water-based displacement fluids is a brine.

5. The method of claim 1, wherein:
at least one of the first and second water-based displacement fluids contains potassium chloride.

6. The method of claim 1, wherein:
at least one of the first and second water-based displacement fluids is viscosified.

7. The method of claim 1, wherein:
at least one of the first and second water-based displacement fluids contains a bridging agent.

8. The method of claim 1, wherein:
the sand control screen assembly includes shunt tubes.

9. The method of claim 1, wherein:
the sand control screen assembly includes diverter valves to divert fluid returns to facilitate prevention of pressure build up.

10. The method of claim 1, wherein:
the sand control screen is an expandable screen.

11. The method of claim 1, further comprising:
introducing a gravel pack slurry containing gravel and a water-based carrier fluid into the wellbore.

12. The method of claim 11, wherein:
the carrier fluid includes a shale inhibitor.

13. The method of claim 1, wherein:
the area of the subterranean formation surrounding the wellbore contains reactive shale.

14. The method of claim 1, wherein:
at least one of 1) a mutual solvent, 2) a surfactant, and 3) a fresh synthetic or oil-based fluid that is free of drilled solids is introduced into the wellbore ahead of the first water-based displacement fluid.

15. The method of claim 11, wherein:
the carrier fluid is an aqueous brine.

16. The method of claim 11, wherein:
the water-based carrier fluid is viscosified.

17. A method of installing a sand control screen assembly in a wellbore penetrating a subterranean formation, wherein the area of the subterranean formation surrounding the wellbore contains reactive shale, the wellbore having a cased section and an uncased section and initially containing synthetic or oil-based drilling fluids containing drilled solids, wherein the uncased section is liner-less, the method comprising:
introducing a first water-based displacement fluid that contains a shale inhibitor into the wellbore to displace the synthetic or oil-based drilling fluids from the uncased, liner-less section of the wellbore;
introducing a second water-based displacement fluid into the wellbore to displace fluids within the cased section of the wellbore, the second water-based displacement fluid containing a shale inhibitor that is the same or different from that contained in the first water-based displacement fluid; and
then running the sand control screen assembly through the first and second water-based displacement fluids to a selected depth within the uncased, liner-less section of the wellbore to facilitate a gravel packing operation, whereby installation of a predrilled liner is avoided.

18. The method of claim 17, wherein:
the shale inhibitor is comprised of at least one of an acrylamide-based polymer, a lignosulfonate, a glycol and an amine.

19. The method of claim 17, further comprising:
introducing a gravel pack slurry containing gravel and a water-based carrier fluid into the wellbore.

20. The method of claim 17, wherein:
at least one of 1) a mutual solvent, 2) a surfactant, and 3) a fresh synthetic or oil-based fluid that is free of drilled solids is introduced into the wellbore ahead of the first water-based displacement fluid.

21. A method of treating a subterreanean formation penetrated by a wellbore, wherein the area of the subterranean formation surrounding the wellbore contains reactive shale and initially comprises synthetic or oil-based drilling fluids containing drilled solids, the method comprising:
introducing a first water-based displacement fluid that contains a shale inhibitor into the wellbore to displace the synthetic or oil-based drilling fluids in a first section of the wellbore;
introducing a second water-based displacement fluid into the wellbore to displace fluids within a second section of the wellbore, the second water-based displacement fluid containing a shale inhibitor that is the same or different from that contained in the first water-based displacement fluid; and
running a sand control screen assembly through the first and second water-based displacement fluids to a selected depth, whereby installation of a predrilled liner is avoided.

22. The method of claim 21 wherein the wellbore comprises a cased section and an uncased section.

23. The method of claim 21, further comprising:
introducing a gravel pack slurry containing gravel and a water-based carrier fluid into the wellbore.

24. The method of claim 21, wherein:
the shale inhibitor is comprised of at least one of an acrylamide-based polymer, a lignosulfonate, a glycol and an amine.

25. The method of claim 21, wherein:
the sand control screen is an expandable screen.

* * * * *